US011775824B1

(12) United States Patent
Hahn et al.

(10) Patent No.: US 11,775,824 B1
(45) Date of Patent: Oct. 3, 2023

(54) LABELING APPARATUS

(71) Applicant: Express Scripts Strategic Development, Inc., St. Louis, MO (US)

(72) Inventors: Andy Hahn, Arnold, MO (US); Thomas E. Henry, Jr., Wildwood, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 175 days.

(21) Appl. No.: 17/206,707

(22) Filed: Mar. 19, 2021

Related U.S. Application Data

(63) Continuation of application No. 16/209,701, filed on Dec. 4, 2018, now abandoned.

(60) Provisional application No. 62/594,522, filed on Dec. 4, 2017.

(51) Int. Cl.
 *G06N 3/08* (2023.01)

(52) U.S. Cl.
 CPC ..................................... *G06N 3/08* (2013.01)

(58) Field of Classification Search
 None
 See application file for complete search history.

(56) References Cited

U.S. PATENT DOCUMENTS

| | | | |
|---|---|---|---|
| 6,578,003 B1 | 6/2003 | Camarda | |
| 10,402,524 B2 | 9/2019 | Cao | |
| 10,592,635 B2 | 3/2020 | Sha | |
| 10,599,807 B2 | 3/2020 | Sha | |
| 10,606,975 B2 | 3/2020 | Sha | |
| 10,621,301 B2 | 4/2020 | Sha | |
| 10,657,376 B2 | 5/2020 | Lee | |
| 10,699,055 B2 | 6/2020 | Sha | |
| 10,706,200 B2 | 7/2020 | Sha | |
| 10,990,747 B2 | 4/2021 | Sha | |
| 2007/0168228 A1 | 7/2007 | Lawless | |
| 2008/0046294 A1 | 2/2008 | Fiedotin | |
| 2009/0043608 A1 | 2/2009 | Nadas | |
| 2012/0017790 A1 | 1/2012 | Adler | |
| 2014/0081903 A1 | 3/2014 | Koosel | |
| 2015/0012355 A1* | 1/2015 | Efrat | G06Q 30/0254 705/14.52 |
| 2015/0172308 A1 | 6/2015 | Borohovski | |
| 2015/0199159 A1 | 7/2015 | Hoover | |
| 2017/0213007 A1 | 7/2017 | Moturu | |
| 2018/0203912 A1 | 7/2018 | Cao | |
| 2021/0072635 A1 | 3/2021 | Ma | |

* cited by examiner

*Primary Examiner* — Devin C Hein
(74) *Attorney, Agent, or Firm* — Schwegman Lundberg Woessner

(57) ABSTRACT

Systems and methods are provided for receiving a data set that includes demographic data and population data; training, based on the data set, a neural network to establish a relationship between different physical layouts of messages and responses to the different physical layouts of the messages; applying the trained neural network to a user profile to predict a physical layout of a message; generating instructions for an electronic device based on the predicted physical layout of the message, the instructions comprising the message; and transmitting the instructions to the electronic device to create a physical label having a layout corresponding to the predicted physical layout of the message.

15 Claims, 2 Drawing Sheets

LABELING APPARATUS

CROSS-REFERENCE TO RELATED APPLICATIONS

This application is a continuation of U.S. application Ser. No. 16/209,701 which was filed Dec. 4, 2018 and which claims the benefit of U.S. provisional patent application 62/594,522 filed on Dec. 4, 2017, entitled "SYSTEMS AND METHODS FOR TARGETED INTERVENTION AND COMMUNICATIONS WITH PATIENT". The entire disclosures of these applications are incorporated herein by reference.

BACKGROUND

The present disclosure relates generally to the technical field of electronic labeling devices.

BRIEF SUMMARY

Systems and methods are provided for receiving a data set that includes demographic data and population data; training, based on the data set, a neural network to establish a relationship between different physical layouts of messages and responses to the different physical layouts of the messages; applying the trained neural network to a user profile to predict a physical layout of a message; generating instructions for an electronic device based on the predicted physical layout of the message, the instructions comprising the message; and transmitting the instructions to the electronic device to create a physical label having a layout corresponding to the predicted physical layout of the message.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
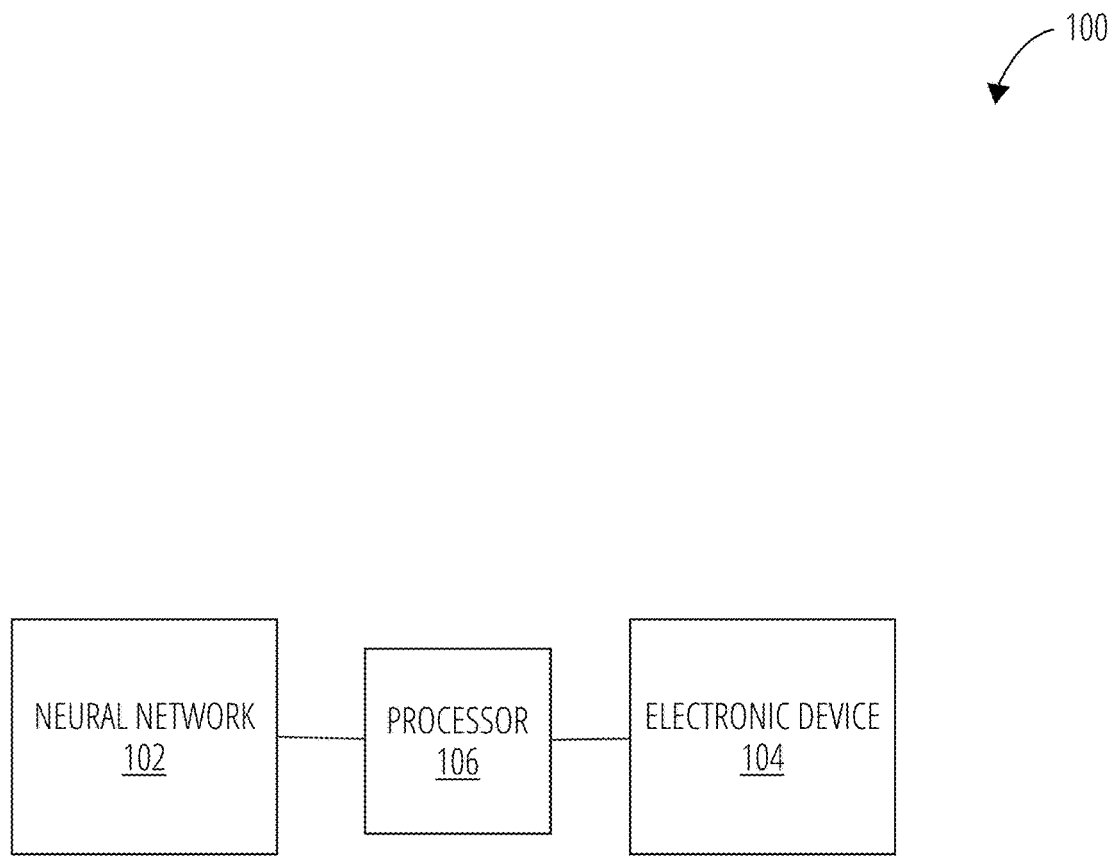
FIG. 1 illustrates a labeling system 100 in accordance with one embodiment.

FIG. 1 illustrates a labeling system 100 in accordance with one example. The labeling system 100 includes a neural network 102, a processor 106 and an electronic device 104. The processor 106 receives a data set that includes demographic data and population data. The processor 106 provides the data set to the neural network 102.

The neural network 102 is trained, based on the data set received from the processor 106, to establish a relationship between different physical layouts of messages and responses to the different physical layouts of the messages. The neural network 102 is applied to a user profile to predict a physical layout of a message.

As an example, if the user should receive a savings message per the data sets and analytics, but has not responded to prior messages per a set limit or factor, then the second-best intervention message would be communicated by the processor 106. As part of machine learning, the system also interprets population behaviors to the intervention messages and determines if similar populations sets are likely to respond, e.g., after two identical intervention messages, versus four in order to optimize when to be persistent, versus default to the secondary opportunity.

Example supervised learning modules include linear regression and decision trees, such as those trained to explain dependent variables using explanatory variables. Through the training process, parameters or weighting may be revised to minimize a loss function and make predictions as correct as possible.

The predicted physical layout of the message is provided to the processor 106. The processor 106 generates instructions, that include the message, for the electronic device 104 based on the predicted physical layout of the message. The processor 106 transmits the instructions to the electronic device 104 to create a physical label having a layout corresponding to the predicted physical layout of the message. The electronic device 104 outputs the physical label. The electronic device 104 can include an electronic labeling device. Certain examples of the labeling system 100 are discussed in greater detail in commonly-owned Andy Hahn et al. U.S. patent application Ser. No. 16/209,701, filed on Dec. 4, 2018, which is hereby incorporated by reference in its entirety and in commonly-owned Andy Hahn et al. U.S. Patent Application No. 62/594,522, filed on Dec. 4, 2017, which is hereby incorporated by reference in its entirety.

Figure 2:
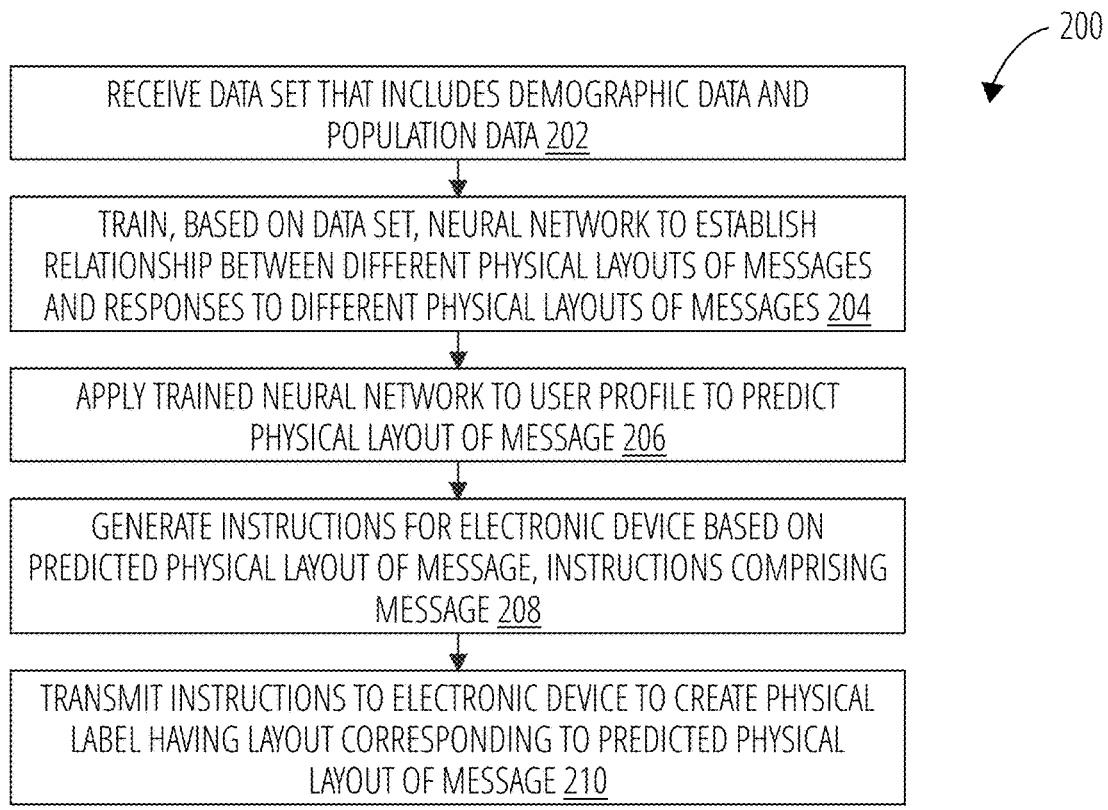
FIG. 2 illustrates a routine 200 in accordance with one embodiment.

FIG. 2 illustrates a routine 200 for generating labels in accordance with one example. Routine 200 is performed by the labeling system 100 discussed above in connection with FIG. 1.

In block 202, routine 200 receives a data set that includes demographic data and population data. In block 204, routine 200 trains, based on the data set, a neural network to establish a relationship between different physical layouts of messages and responses to the different physical layouts of the messages. In block 206, routine 200 applies the trained neural network to a user profile to predict a physical layout of a message. In block 208, routine 200 generates instructions for an electronic device based on the predicted physical layout of the message, the instructions comprising the message. In block 210, routine 200 transmits the instructions to the electronic device to create a physical label having a layout corresponding to the predicted physical layout of the message.

In the example embodiment, the labels are rectangular. In other embodiments, the labels may be of a different size and/or shape. A user with a high risk of non-adherence will be sent an adherence message. If that user is down to zero refills, a refill message will be sent instead. The need for refills takes precedence or is higher priority because the refill is required for adherence.

It will be apparent to those skilled in the art that various modifications and variations can be made in the present invention without departing from the spirit or scope of the invention. Thus, it is intended that the present invention cover the modifications and variations of this invention provided that they come within the scope of any claims and their equivalents.

What is claimed is:

1. A method comprising:
 receiving a data set that includes demographic data and population data;
 training, based on the data set, a neural network to establish a relationship between different physical layouts of messages and responses to the different physical layouts of the messages, the training of the neural network comprising:

identifying, based on the population data, a first population set that responds to messages after being presented with a first quantity of identical messages;
identifying, based on the population data, a second population set that responds to the messages after being presented with a second quantity of identical messages; and
optimizing the neural network to determine a specified quantity of messages to deliver to a given user prior to defaulting to communicating an alternate message to the given user;
applying the trained neural network to a user profile to predict a physical layout of a message;
generating instructions for an electronic device based on the predicted physical layout of the message, the instructions comprising the message; and
transmitting the instructions to the electronic device to create a physical label having a layout corresponding to the predicted physical layout of the message.

2. The method of claim 1, comprising:
minimizing a loss function to update parameters of the neural network.

3. The method of claim 1, wherein the different physical layouts of messages comprise messages having different sizes and different shapes.

4. The method of claim 1, wherein a refill message is prioritized above an adherence message in response to determining that the given user has no remaining refills.

5. The method of claim 1, wherein the neural network is trained through a linear regression model.

6. A system comprising:
a memory; and
one or more processors coupled to the memory and configured to execute instructions stored in the memory to perform operations comprising:
receiving a data set that includes demographic data and population data;
training, based on the data set, a neural network to establish a relationship between different physical layouts of messages and responses to the different physical layouts of the messages, the training of the neural network comprising:
identifying, based on the population data, a first population set that responds to messages after being presented with a first quantity of identical messages;
identifying, based on the population data, a second population set that responds to the messages after being presented with a second quantity of identical messages; and
optimizing the neural network to determine a specified quantity of messages to deliver to a given user prior to defaulting to communicating an alternate message to the given user;
applying the trained neural network to a user profile to predict a physical layout of a message;
generating instructions for an electronic device based on the predicted physical layout of the message, the instructions comprising the message; and
transmitting the instructions to the electronic device to create a physical label having a layout corresponding to the predicted physical layout of the message.

7. The system of claim 6, the operations comprising:
minimizing a loss function to update parameters of the neural network.

8. The system of claim 6, wherein the different physical layouts of messages comprise messages having different sizes and different shapes.

9. The system of claim 6, wherein a refill message is prioritized above an adherence message in response to determining that the given user has no remaining refills.

10. The system of claim 6, wherein the neural network is trained through a linear regression model.

11. A method comprising:
receiving a data set that includes demographic data and population data;
training, based on the data set, a neural network to establish a relationship between different physical layouts of messages and responses to the different physical layouts of the messages, the different physical layouts of messages comprise messages having different sizes and different shapes, the training of the neural network comprising:
identifying, based on the population data, a first population set that responds to messages after being presented with a first quantity of identical messages;
identifying, based on the population data, a second population set that responds to the messages after being presented with a second quantity of identical messages;
minimizing a loss function to update parameters of the neural network based on the first and second population sets; and
optimizing the neural network to determine a specified quantity of messages to deliver to a given user prior to defaulting to communicating an alternate message to the given user;
applying the trained neural network to a user profile to predict a physical layout of a message;
generating instructions for an electronic device based on the predicted physical layout of the message, the instructions comprising the message; and
transmitting the instructions to the electronic device to create a physical label having a layout corresponding to the predicted physical layout of the message, wherein a refill message is prioritized above an adherence message in response to determining that the given user has no remaining refills.

12. The method of claim 11, comprising:
minimizing a loss function to update parameters of the neural network.

13. The method of claim 11, wherein the different physical layouts of messages comprise messages having different sizes and different shapes.

14. The method of claim 11, wherein a refill message is prioritized above an adherence message in response to determining that the given user has no remaining refills.

15. The method of claim 11, wherein the neural network is trained through a linear regression model.

* * * * *